United States Patent
Thielcke et al.

(10) Patent No.: US 8,491,827 B2
(45) Date of Patent: Jul. 23, 2013

(54) OPERATING ELEMENT AND METHOD FOR THE PRODUCTION THEREOF

(75) Inventors: Bjorn Thielcke, Kusnacht (CH); Christoph Keist, Wattwil (CH); Stefan Birrer, Zug (CH)

(73) Assignee: Abatek International AG, Bassersdorf (CH)

( * ) Notice: Subject to any disclaimer, the term of this patent is extended or adjusted under 35 U.S.C. 154(b) by 397 days.

(21) Appl. No.: 12/796,024

(22) Filed: Jun. 8, 2010

(65) Prior Publication Data
US 2010/0310814 A1    Dec. 9, 2010

(30) Foreign Application Priority Data

Jun. 9, 2009  (CH) .......................................... 881/09
Jul. 7, 2009  (CH) ........................................ 1054/09

(51) Int. Cl.
*B28B 7/22* (2006.01)
*B29C 35/08* (2006.01)
*H01H 11/00* (2006.01)
*H01H 9/00* (2006.01)
*H01H 3/12* (2006.01)

(52) U.S. Cl.
USPC ........... 264/255; 264/259; 264/319; 264/330; 264/331.11; 264/494; 264/496; 29/527.1; 29/622; 29/825

(58) Field of Classification Search
USPC ................... 264/255, 259, 319, 330, 331.11, 264/494, 496; 200/310, 314, 341, 513; 29/527.1, 622, 825
See application file for complete search history.

(56) References Cited

U.S. PATENT DOCUMENTS

| 4,039,068 | A |   | 8/1977 | Giorza et al. |
|---|---|---|---|---|
| 4,464,326 | A | * | 8/1984 | Nishihira ...................... 264/246 |
| 4,657,419 | A | * | 4/1987 | Takakuwa .................... 400/490 |
| 5,514,319 | A | * | 5/1996 | Young .......................... 264/132 |
| 5,681,515 | A | * | 10/1997 | Pratt et al. .................... 264/153 |
| 6,355,890 | B1 | * | 3/2002 | Kuroda ......................... 200/5 A |
| 6,423,171 | B1 | * | 7/2002 | Yang ............................. 156/245 |
| 6,573,463 | B2 | * | 6/2003 | Ono .............................. 200/5 A |

(Continued)

FOREIGN PATENT DOCUMENTS

| DE | 2362380 | | 6/1974 |
|---|---|---|---|
| DE | 202005012021 | U1 | 11/2005 |

(Continued)

*Primary Examiner* — Christina Johnson
*Assistant Examiner* — Atul P. Khare
(74) *Attorney, Agent, or Firm* — The Webb Law Firm (57) ABSTRACT

A method for producing a flexible, three-dimensional coating structure with a surface curvature on the front side and an impression on the rear side for a flexible switch or a flexible user interface. The method is essentially characterized by the following steps: introducing an uncured, transparent casting compound into a compression mold with an impression that forms the shaping of a surface curvature; introducing a counterpunch that penetrates at least partially into the impression, so that the casting compound is distributed in the gap between the shaping of the surface curvature of the compression mold and the surface of the counterpunch and fills this gap; introducing energy into the casting compound, so that the casting compound cures to form a substantially self-supporting, flexible, transparent surface layer with a surface curvature on the front side and an impression on the rear side.

13 Claims, 9 Drawing Sheets

U.S. PATENT DOCUMENTS

| | | | |
|---|---|---|---|
| 6,967,056 B2 * | 11/2005 | Kashino | 428/189 |
| 7,523,544 B2 * | 4/2009 | Hsu | 29/622 |
| 7,759,588 B2 * | 7/2010 | Hsu | 200/5 A |
| 7,834,285 B2 * | 11/2010 | Hsu | 200/333 |
| 7,884,295 B2 * | 2/2011 | Aoki et al. | 200/314 |
| 8,181,330 B2 * | 5/2012 | Kato et al. | 29/527.1 |
| 2002/0005791 A1 | 1/2002 | Ono | |
| 2008/0224347 A1 | 9/2008 | Hsu | |
| 2009/0057121 A1 * | 3/2009 | Yoshida et al. | 200/5 A |
| 2009/0301852 A1 * | 12/2009 | Keist et al. | 200/341 |

FOREIGN PATENT DOCUMENTS

| | | |
|---|---|---|
| EP | 0298873 A1 | 1/1989 |
| EP | 0772213 A1 | 5/1997 |
| GB | 2166383 A | 5/1986 |
| JP | 6005151 A | 1/1994 |
| JP | 10278125 A | 10/1998 |
| JP | 11213792 A | 8/1999 |
| WO | 2006137645 A1 | 12/2006 |

* cited by examiner

OPERATING ELEMENT AND METHOD FOR THE PRODUCTION THEREOF

TECHNICAL FIELD

The present invention concerns a method for producing a flexible, three-dimensional coating structure for a flexible switch or a flexible user interface.

PRIOR ART

Operating elements, for example in an automobile, are today realized by a classic construction of plastic keys seated in a housing. This arrangement inevitably produces a relatively thick, obtrusive construction for accommodating the keys and gaps between the individual keys. The housing surface is in this case usually given a curved three-dimensional form.

Solutions known today are as follows:

On the one hand, membrane keyboards with embossments or an applied coating are known. Such membrane keyboards meet the requirements for a closed surface and, when embossments or a selectively applied coating are used, for integrally formed key geometries, but they are still restricted to a flat basic geometry. For example, DE 20 2005 012 021 U1 describes an operating element in which a key is provided on a completely flat surface, for example of polyester, which has peripheral bordering embossments respectively in the region of the keys. The region of the bordering embossments is for this purpose filled with a polymeric coating material with antibacterial constituents and given its three-dimensional effect and high gloss by means of UV irradiation. In other words, the shaping of the surface is in this case provided by the possibility of arranging a material in this bordering embossment before curing, that is to say only a smooth, slightly curved surface can be achieved.

On the other hand, thermoformed films are known. Thermoforming allows films to be brought into a three-dimensional form and also allows key geometries to be integrally formed. Restrictions are imposed by the necessary bending radii (no sharp edges possible) and by the minimum spacing between the keys (sufficient material for the thermoforming must be present between the keys). The functional actuation of such a key is also not easy to realize, since the deformed film must follow the key stroke.

Furthermore, silicone surfaces are known. Freely formed functional user interfaces can be produced from silicone. This solution is distinguished by a soft surface and limited brilliance of the silicone colours. For this reason, this solution is generally not chosen specifically for large-area applications.

Finally, so-called UV keypads are known. In this case, a casting compound which reproduces the surface structure and the key shapes is applied to a flexible film of plastic. Such technology is described, for example, in US 2008/224347. The procedure followed in this case is that a mould which represents a negative of the key shapes is provided, a casting compound is introduced into the mould, a flexible film of plastic is placed on and the film of plastic is subsequently rolled from the rear side with a roller in such a way that the casting compound is pressed into the mould, thereby filling it. The material is subsequently cured, that is to say the cured casting compound is subsequently attached on the film of plastic and forms the surface structure. The surface structure is subsequently brought together in a multilayer laminate to form the actual switch. This technology meets many requirements, but the method only allows relatively flat surface structures.

SUMMARY OF THE INVENTION

One of the aims of the present invention is to extend UV keypad technology to surfaces that are actually three-dimensional. Therefore, one of the aims of this invention is to produce a closed three-dimensionally formed user interface, preferably with integrally formed functional key geometries, from a plastic with a high-quality appearance.

Correspondingly, the present invention specifically concerns a method for producing a flexible, three-dimensional coating structure with a surface curvature on the front side and an impression on the rear side for a flexible switch or a flexible user interface.

The method thereby comprises at least the following steps:
1. An uncured, that is to say normally substantially non-elastically deformable and at least viscous, transparent casting compound is introduced into a compression mould with an impression that forms the shaping of a surface curvature (a cavity as it were), for example by introducing a drop or a splash into the impression.
2. A counterpunch that penetrates at least partially into the impression is introduced into the impression, so that the casting compound is distributed in the gap between the shaping of the surface curvature of the compression mould and the surface of the counterpunch and fills this gap substantially completely. The counterpunch thereby forms as it were a positive in relation to the negative impression in the compression mould, the actual cavity being formed between this positive and the negative of the impression.
3. Subsequently, energy is introduced into the moulding compound, so that the moulding compound cures to form a substantially self-supporting, flexible, transparent surface layer with a surface curvature on the front side and an impression on the rear side. The energy may in this case be introduced either in the form of heat or in the form of UV radiation; typically, at least partial crosslinking and/or polymerization of the moulding compound takes place during the curing process.

The resultant surface layer or the coating structure therefore takes the form as it were of a pan and has a three-dimensional structured, i.e. concave and/or convex, surface and a corresponding convex or concave rear side. Therefore, by contrast with the structures according to the prior art, the rear side is inwardly curved and allows further functional elements, such as for example an elastic support, electrical elements, etc., to be received in the corresponding hollow space.

Therefore, as far as a UV keypad is concerned, a closed, actually three-dimensional surface layer can be formed, with a thickness typically in the range of 0.02-1.5 mm, it being possible for additional thicker regions that protrude above the surface to be provided in the form of key contours (compare further below). In the region outside the key contours, the surface layer of the casting compound preferably has a thickness in the range of 0.05-0.15 mm.

As already mentioned, the energy for curing the casting compound is preferably introduced in the form of UV radiation. To make it possible that the curing can be carried out while the casting compound is lying in the compression mould, either the compression mould and/or the counterpunch may be formed such that it is as it were substantially transparent to the irradiated radiation. The counterpunch and/or the compression mould may therefore consist at least in certain regions of material that is substantially permeable to the irradiated UV radiation, such as for example transparent silicone or glass, possibly in a coated form. According to a further embodiment, the counterpunch is preferably formed such that it is substantially permeable to the irradiated UV radiation, which then makes it possible that the UV radiation is introduced into the casting compound through the counterpunch.

The casting compound may be cured in one or more steps or stages. For instance, it is possible to cure the casting compound in only a single final step, but it is also possible to cure the compound in two steps, for example by the casting compound being pre-cured together with the film in a first step and only after the decoration of the film brought into the definitive three-dimensional shape and subsequently post-cured, that is to say completely cured.

A further preferred embodiment is distinguished by the fact that the compression mould has in the impression, along with the shaping of the surface curvature, in its curved surface at least one, preferably more, further, deeper impressions, preferably in the form of negatives of key-shaped indentations. These are the aforementioned key contours, of which there may be many. These deeper impressions are likewise filled by the casting compound in the process and form a three-dimensional surface structure (the key contours) in the coating structure. The counterpunch may likewise have further positive indentations in the region of these contours, but preferably the counterpunch does not have such additional indentations, so that the coating structure has a greater thickness in each case in the region of the three-dimensional surface structure (the key contours) than in the surrounding regions.

The thickness of the surface layer in the region of the key contours may then lie in the range of 0.2-3.0 mm; it is typically possible that the key contours protrude by 0.5-1.5 mm above the surface of the remaining surface layer.

One (or more), preferably transparent, films may preferably be placed between the counterpunch and the casting compound, which film or films is/are joined to the transparent surface layer after the curing of the casting compound.

The surface layer generally does not have to be continuous, in other words a film arranged behind the surface layer, irrespective of whether it is provided in the mould or thereafter, may be partially exposed at the surface. If such a film is exposed at the surface, it preferably has a scratch-resistant and/or fingerprint-resistant coating.

According to a preferred embodiment, the film may have been brought into a three-dimensional form before placement, for example in a thermoforming process. Such a film with an already predetermined shape may, for example, be placed onto the counterpunch before the insertion of the same into the compression mould, or else it may be placed into the compression mould after the introduction of the casting compound into the impression of the compression mould.

However, it is also possible according to a further preferred embodiment to provide a further, second compression mould exclusively for the preforming of this film, which as it were represents a negative in relation to the surface contouring of the counterpunch. In the case of this embodiment, a flat film is then passed over the second compression mould or in front of the counterpunch, and, in a first step, the counterpunch is introduced into the second compression mould (possibly with additional heat exposure in order that the film can undergo forming more easily), with the film being brought into its three-dimensional form. Subsequently, the counterpunch with the deformed films on it is removed from the second compression mould and passed directly into the compression mould into which the casting compound has already been introduced.

Alternatively, it is possible to produce the surface layer from the casting compound initially without a film, using a compression mould and a counterpunch, and subsequently to thermoform a film with the same counterpunch, and then introduce the film into the hollow space on the rear side of the surface layer and join it to the surface layer with a material bond.

Such a film may consist of various materials and is preferably transparent. The film may consist of polyester, polyethylene, polypropylene, polycarbonate, PET or polyurethane; it may in this case also be a multilayer film consisting of the same or different materials. The term film, as it is used hereafter, correspondingly also includes multilayer films. Furthermore, instead of a film or in combination with such a film, a skin for auto interiors of PVC, PU and/or TPO (thermoplastic olefin elastomer) may also be used. Preferably, polycarbonate is used for the film. Such a film preferably has a thickness in the range of 0.1-1 mm, preferably in the range of 0.2-0.5 mm. The thickness of the surface layer of the casting compound is typically at most 1.5 times as great as the thickness of the film.

As already indicated, it is also possible that the at least one film is placed into the impression on the rear side and joined to the surface layer with a material bond, the film preferably having been already brought into a three-dimensional form before placement, in particular preferably in a thermoforming process. Such a subsequently introduced film may also be provided in addition to a film already placed into the mould during the production of the surface layer; the two films are then joined to each other with a material bond. The joining of the surface layer to the film or the joining of the films to each other preferably takes place with the aid of a UV adhesive. Because the casting compound is transparent, the adhesive may in this case be activated by irradiation through the already cured surface layer. A heat-activatable adhesive or a two-component adhesive is likewise possible.

A further preferred embodiment is characterized in that at least one of the films is provided with a surface decoration on the front side facing the surface layer and/or the rear side, it being possible for this surface decoration to be applied preferably in a printing process, such as in particular screen printing, laser printing, stamp printing or spray printing.

A surface decoration may be applied to one or more such films before and/or after the forming of the surface layer.

As already mentioned, a number of films may also be used in such a construction. For instance, according to a further embodiment, it is possible that at least two films are used, at least one first film, which is transparent to the UV radiation with which it is irradiated for the curing of the casting compound, being placed between the counterpunch and the casting compound and therefore joined directly to the casting compound, and at least one second film, which is preferably brought into a three-dimensional form before the placement and may, for example, have a surface decoration on the front side and/or the rear side, being placed into the impression on the rear side (where the first film is arranged) and joined to the rear side of the first film, preferably with a material bond.

In particular if an actual switch is to be constructed, according to a further preferred embodiment, a support of transparent elastic material, in particular of silicone, is placed into the impression on the rear side and joined to the surface layer at least indirectly with a material bond.

In this case, the support may either be used already prefabricated in its three-dimensional shaping (for example produced in an injection-moulding process), in which case it then has a surface decoration on its surfaces facing the surface layer, or the support may even be shaped directly in the impression on the rear side in a moulding process, in which case the same compression mould may, for example, still be used as a matrix.

A further preferred embodiment is characterized in that the support, which preferably has on its rear side facing away from the surface layer actuating plungers, which are movable by way of a membrane formed in the support, is placed with the surface layer fastened thereto on the upper side, preferably with at least one film lying in between, onto a printed circuit board, preferably with snap domes and/or contact pills lying in between, to form a switch and is at least indirectly joined to the printed circuit board.

Around such actuating plungers, further plungers or a surrounding ring may be formed in the support as overload protection for snap domes. Moreover, the support may have hard reinforcement for hard surface regions in the non-key region.

It is generally possible to provide an additional transparent protective layer on the surface of the surface layer; the protective layer may also be only partially transparent, in order for example to provide backlighting only at specific locations.

Generally, lighting elements may be provided in the region of the printed circuit board and/or in the region of the support. For example, in the form of light guides (for example light guide films) and/or light shielding and/or backlighting elements, preferably with the aid of LEDs, light guiding films or EL films.

As already mentioned, it is possible if films are used to decorate these films, it being possible for this decoration to be produced before the thermoforming of a film and/or before or after the forming of the surface layer. Moreover, it is possible to provide a surface decoration and/or decorative inserts on and/or in the outer surface of the surface structure. Said inserts may, for example, also be placed in the compression mould and thus joined to the casting compound.

The inner surface of the compression mould is preferably formed such that it does not allow the casting compound to stick, at least in its cured form.

For the process to be optimally conducted, it is also advantageous if the compression mould has guiding elements for guiding the counterpunch during the insertion of the counterpunch into the cavity of the compression mould.

Furthermore, the present invention concerns a flexible, three-dimensional coating structure of a transparent cured casting compound, with a surface curvature on the front side and an impression on the rear side for a flexible switch or a flexible user interface, or as a component part of such a functional element, preferably produced in a method such as that presented above.

Furthermore, the present invention concerns the use of such a coating structure or such a switch and/or such a user interface with such a coating structure as an operating unit in the centre console of automobiles, a component part of a car radio, climatic control system, as a steering wheel switch, as a component part of a door handle with integrated keys, as a component part of a computer mouse, as a component part of a games console, as a component part of a keypad for mobile phones and desktop phones.

Further embodiments are specified in the dependent claims.

BRIEF DESCRIPTION OF THE DRAWINGS

Preferred embodiments of the invention are described below with reference to the drawings, which serve only for explanation and should not be interpreted in a restrictive manner. In the drawings:

FIG. 1 shows a schematic sectional representation of a switch construction with a number of keys, a variant with a soft elastic support being represented in a) and a variant with a hard support being represented in b);

FIG. 2 shows two of the method steps in a schematic representation, the compression mould with moulding compound being represented in a) and the compression mould with an inserted counterpunch being represented in b);

DESCRIPTION OF PREFERRED EMBODIMENTS

Figure 1A:
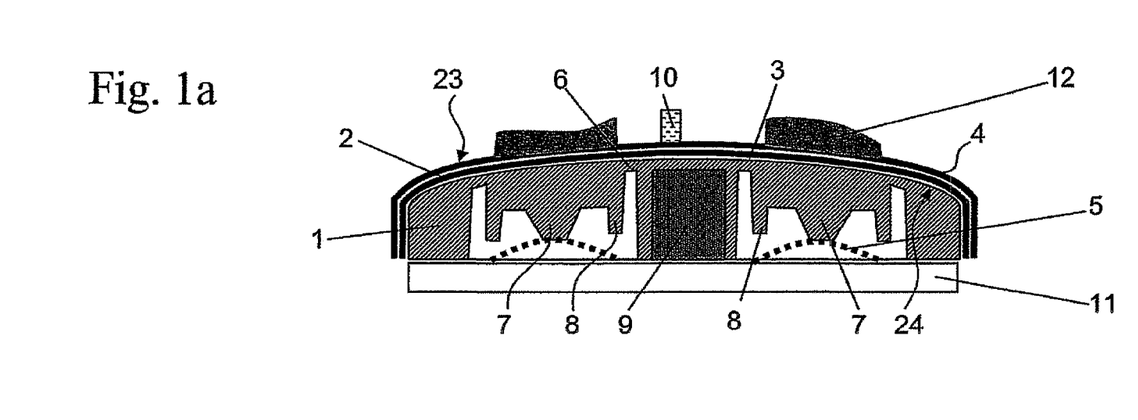

FIG. 1a shows the construction of the user interface in a schematic sectional representation. A three-dimensionally deformed flexible and transparent film 2 is arranged on a support 1 of transparent flexible material (for example silicone) and joined to the support, usually with a material bond. Provided on the film 2 is a decorative layer 3 of surface colour, for example in the form of symbols, and effects. The decorative layer may either be provided on the side facing the support 1, or else on the other side. Moreover, a decorative layer may also be arranged on the surface of the support 1 that is facing the film 2.

It is likewise possible to provide decoration on the surface of the surface layer 4.

On the film 2, and joined to it, there follows a surface layer 4 with formed-on keys 12 and a surface structure. This surface layer 4 is produced from a transparent casting compound.

Underneath the support 1, snap domes 5 for key haptics and electrical contact are provided on a printed circuit board 11 with electrical countercontacts and LEDs for backlighting. Alternatively or in addition, contact pills may be provided. These are respectively underneath an actuating plunger 7, which is formed from the material of the support 1 and is movable by way of a membrane 6. An overload protecting ring 8 for the step dome 5 may be optionally provided around such a plunger. Moreover, it is possible to provide the support with a hard reinforcement 9 for those regions where the overall structure is not intended to be soft.

Decorative inserts 10, for example of plastic or metal, may also be provided on the surface or at least partially integrated into the surface of the surface layer 4.

The transparent film 2 is deformed by thermoforming in order to replicate a three-dimensional user interface. A surface layer 4 with a desired surface structure (for example mat or polished) and formed-on keys 12 is provided over the film 2 by means of a transparent casting compound. The decorative layer 3, for example on the rear side of the film 2, provides surface colours and symbols. The film 2 is fixed on the elastic support 1. The support 1 is in turn placed over a printed circuit board 11. In the regions of the keys, a membrane 6 is moulded in the support, so that the key can in each case be individually activated. Underneath the keys are snap domes 5 for the key haptics and the electrical switching. The snap domes are activated by means of actuating plungers 7 that are formed on in the support 1 and optionally protected from forces of improper use by the overload protecting ring 8. LEDs (not represented) may be used for backlighting the user interface. Additional reinforcements 9 may be introduced into the elastic support 1 in order to make the surface hard in the non-key region. Decorative inserts 10 may be provided in the surface layer 4 by being placed in the mould directly with the moulding compound or be subsequently joined together or adhesively attached.

The support 1 should perform the following functions:
1. A firm base for the film, in order to produce a surface that is as hard and firm as possible in the regions without keys.
2. A flexible membrane 6 in the region of the keys, in order to produce a key stroke.
3. An actuator for the snap dome 7 and the overload protecting ring 8 (both may also be provided in a separate part or, for example, be replaced by a tact switch).
4. A transparent base material for backlighting of the symbols (LEDs on a printed circuit board should be able to shine through at least partially).
5. A means of shutting off light, for example for functional lighting through non-transparent regions.
6. A means allowing fastening in a housing.

The support 1 is ideally produced from silicone or similar elastic and transparent materials such as TPE (thermoplastic elastomer) or TPU. The membrane region is in this case made thin, typically 0.3 mm thick, and such that it runs 1 mm around the key geometry. The silicone support may be additionally reinforced with a hard plastic part 9, so that a hard surface is produced there.

Figure 1B:
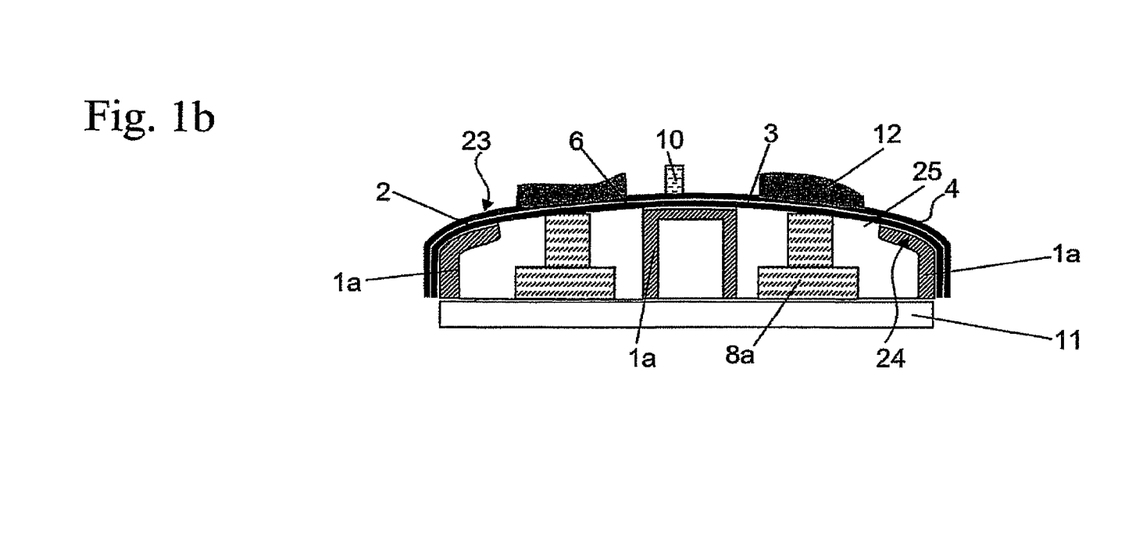

As an alternative to this, as shown by FIG. 1*b*, the support 1*a* may consist of a substantially hard plastic (hard in the sense of: substantially cannot be compressed when undergoing manipulation of the intended manner). Instead of a membrane, such a support 1*a* respectively has a cutout 25 around the respective key region. The actual flexible membrane is then only formed from the film 3 with the surface layer 4. Underneath this membrane there is then typically a microswitch or a switching mat 8*a*.

The support 1 may either be moulded directly behind the film (known as the in mould decoration process) or it is separately produced and fastened to the film by means of an adhesive layer.

As an alternative to being printed on the film 2, the decoration (surface colour, symbols, etc.) may alternatively also be printed, sprayed or lasered on the support 1 (night design process).

The film 2 should have the following properties:
1. Transparency to make the decoration visible
2. Deformable/thermoformable, for example by the thermo or high-pressure forming process
3. Flexible to ensure the functioning of the keys (stroke)
4. Printable for decoration The film 2 may have an additional scratch-resistant coating, in order to protect the film 2 in regions where there is no surface layer 4.

The film 2 should be transparent to UV light for the preferred method of producing the surface layer by UV curing.

In the case of a flat keypad, the film 2 is printed by means of screen printing after application of the surface layer 4 on the rear side. This does not usually work in the case of the three-dimensional method, because the film 2 is no longer flat and screen printing is normally only possible on flat parts. This is one of the main difficulties that is overcome by this invention.

The following methods (compare FIGS. 3-8) for decorating the user interface correspondingly likewise form part of this invention:

Method 1 (compare FIG. 3); here the surface layer is laminated: the film 2 is printed from behind by means of screen printing in a flat state (step 1), then deformed (step 2), cut to size (type 3) and the support is either moulded from behind onto the film 2 or prefabricated and applied to the film from behind (step 4). Finally, a prefabricated surface layer (steps 5-7) is fastened over the film 2 (step 8, for example with transparent UV adhesive or cured from above). Subsequently, the rest of the switch is assembled (step 9).

Method 2 (compare FIG. 4); here the support 1 is decorated: the film is thermoformed (step 1) and subsequently cut to size (step 2). The casting compound 14 (compare further below) is filled into the compression mould (step 3), the counterpunch is introduced and cured together with the film (step 4). In addition, the support is produced (step 5) and the decoration is provided on the surface of the support (step 6, screen printing, spraying, lasering, etc., as for example in the case of a conventional silicone part). Then, the support is joined to the film (step 6) and the rest of the switch is assembled (step 8). Consequently, the transparent film can be brought together with the casting compound in the UV process in one step.

Method 3 (compare FIG. 5); here two films are laminated: 2 films are produced, the first with the decoration (1), the decoration is thereby applied to the flat film (step 1), a second film (2) is provided for joining to the casting compound (transparent film, allows UV curing). Both films are thermoformed (step 2), cut to size (step 3), and the second film is cured together with the casting compound after the casting compound has been filled into the mould (step 4) and the counterpunch has been introduced into the compression mould. In parallel with this, a support is produced (step 6) and joined to the first decorated film (step 7) or else moulded directly behind the first film. In a next step (8), the two films are linked together and joined to each other. This is followed by the usual further steps for producing an actual switch (step 8).

Method 4 (compare FIG. 6); here the film is decorated three-dimensionally from behind: the film is thermoformed (1) and subsequently cut to size (step 2). The casting compound 14 (compare further below) is filled into the compression mould (step 3), the counterpunch is introduced and the counterpunch is introduced and cured together with the film (step 4). The deformed film is subsequently decorated from the inside, for example by means of spraying, pad printing and laser (step 5). In addition, a support is produced (step 6), then the support is joined to the film and the surface layer arranged on the latter (step 7); this is followed by the usual further steps for producing an actual switch (8).

Method 5 (compare FIG. 7); here the film is cured through the decoration: in a first step, the film is printed in the flat state, for example by screen printing (step 1), and subsequently thermoformed (step 2) and cut to size (step 3). The casting compound is filled into the mould (step 4) and subsequently the counterpunch and the film are introduced into the mould and the casting compound is cured together with the film (step 5). In this case, UV radiation is irradiated through the UV-permeable counterpunch; the decoration is in this case likewise UV permeable (either corresponding printing ink or corresponding distribution of the application of the printing). Alternatively, it is possible to bring about the curing under the influence of heat and/or moisture; in this case, the decoration does not have to be UV-permeable. In addition, a support is produced (step 6), the support is subsequently joined to the decorative film and the surface layer arranged on the latter (step 7), and this is followed by the usual steps for producing a switch (step 8).

Method 6 (compare FIG. 8); here the decoration is provided on the surface layer: the film is thermoformed (step 1) and subsequently cut to size (step 2). The casting compound 14 (compare further below) is filled into the compression mould (step 3), the counterpunch is introduced and cured together with the film (step 4). The entire part is produced in a transparent form and right at the end is decorated on the surface (step 5) by means of screen printing, pad printing, spraying, lasering, etc. In addition, a transparent protective coating may also be applied. Subsequently, the support is moulded directly on the rear side of the film (step 6) or prefabricated and introduced into the rear side, and this is followed by the usual steps for producing the switch.

Figure 9:
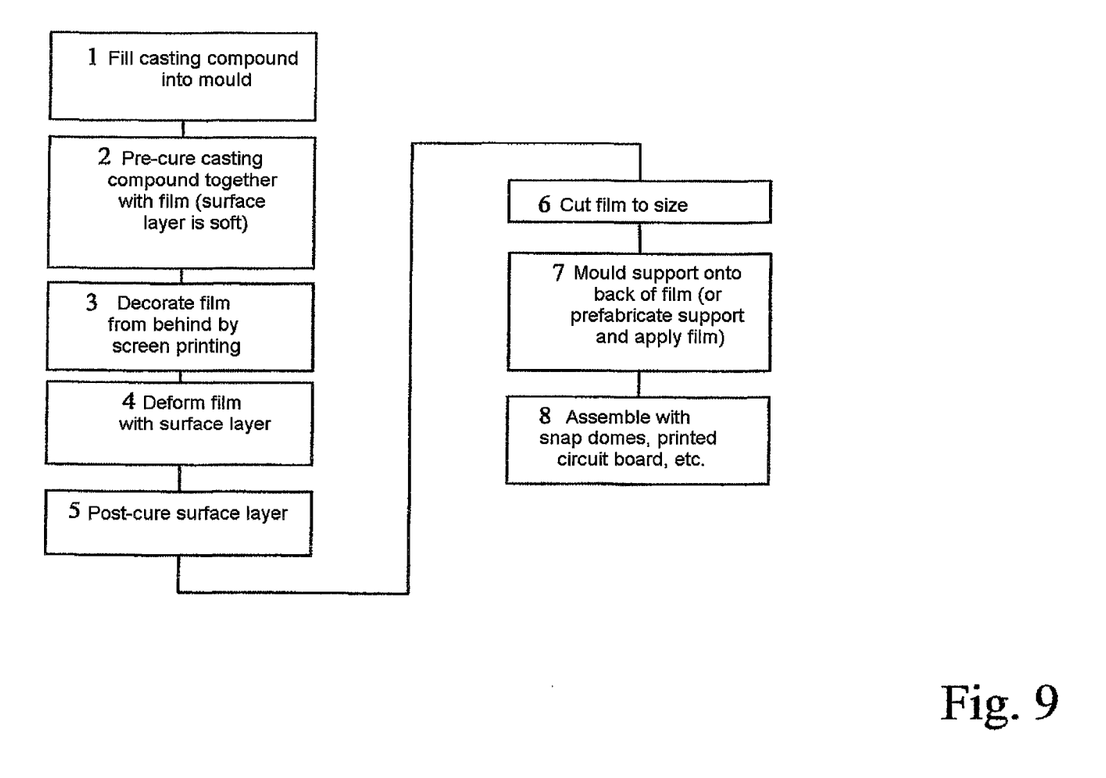
FIG. 9 shows the individual method steps in a method in which the decoration is provided on the surface layer.

Method 7 (compare FIG. 9); here the casting compound 14 is cured in two stages, to be precise is pre-cured together with the film in a first step and only after the decoration of the film is brought into the definitive three-dimensional form and subsequently post-cured, that is to say completely cured. The surface layer is therefore applied to the transparent film (step 1) and "pre-cured" (step 2), but still remains very flexible. Then the film is printed from behind for the decoration (step 3). Only then is the entire film together with the still soft surface layer three-dimensionally deformed (step 4) and the surface layers then completely post-cured (step 5). The pre-curing and/or post-curing may be performed by means of EV, heat, moisture or some other reaction.

The casting compound for producing the surface layer 4 is one of the most important materials of this invention. The surface layer 4 serves on the one hand for generating a desired three-dimensional surface structure (replica of the surface of the mould). On the other hand, with the moulding compound 14, all possible desired structures can be provided on the surface, such as key shapes 12 or separating webs, etc. This typically takes place within a thickness of 0.1-2.0 mm. The surface layer 4 may be continuous over the entire surface or else only in partial regions. The surface layer 4 typically has at least one of the following properties, preferably all of them:
1. Transparency to make the decoration visible
2. Good bonding on film
3. Good abrasion resistance
4. High scratch resistance
5. No yellowing
6. Elastic to make the key stroke possible in the membrane region
7. Coatable for the method according to FIG. 8.

By contrast with keys according to the prior art, with such a surface layer 4 the keys may also be sharp-edged and lie very close together. Likewise, different surface structures cannot be realized with a conventional film alone.

If the scratch resistance or other properties of the surface layer 4 cannot be achieved well enough by means of the casting compound 14, an additional transparent coating of the surface layer 4 may achieve this. In this case, this coating must still allow the functioning of the key and must not, for example, rupture under loading.

An additional decorative effect can be achieved by decorative parts 10 being placed in the mould with the structure for the surface layer 4 before filling with the casting compound 14.

For example, decorative webs of metal or plastic may be introduced into the keys. A further effect may be achieved by means of providing a lens structure in the surface layer; in this way, individual regions can be optically emphasized, in particular also under the effect of lighting from behind or from the front.

Figure 2A:
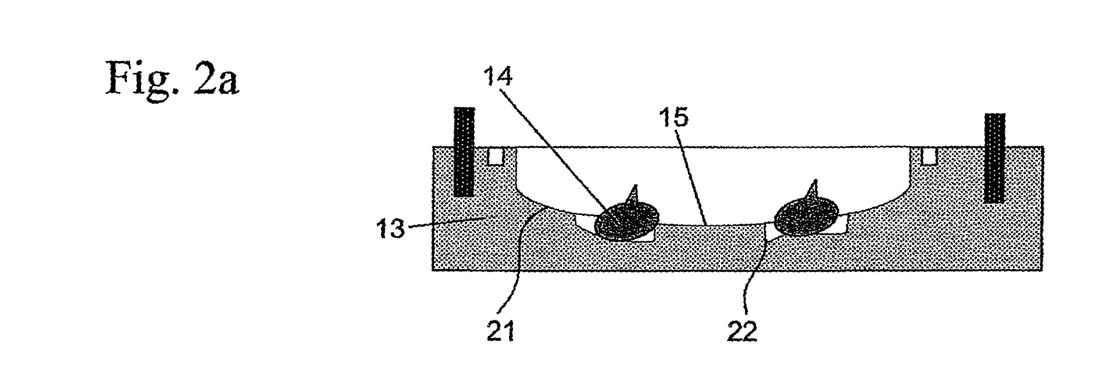

The production of the surface layer 4 is to be explained in more detail on the basis of FIG. 2. In FIG. 2a, the mould for the surface layer is represented in the open state. The mould 13 has in this case an impression 15 with a surface to which the casting compound 14 (in FIG. 2a freshly filled but not yet spread) does not stick (for example steel with a nonstick coating or silicone). In the impression, the shaping for the surface curvature 21 is formed over the entire mould, and provided within this large shaping are small shapings 22, which subsequently form the key regions 12 or webs or similar regions protruding beyond the surface of the surface layer 4.

Figure 2B:
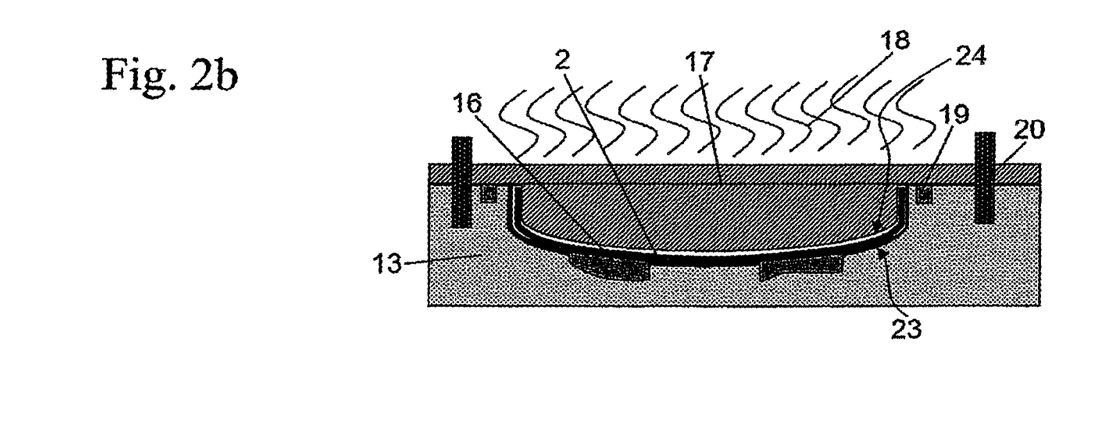
Figure 3:
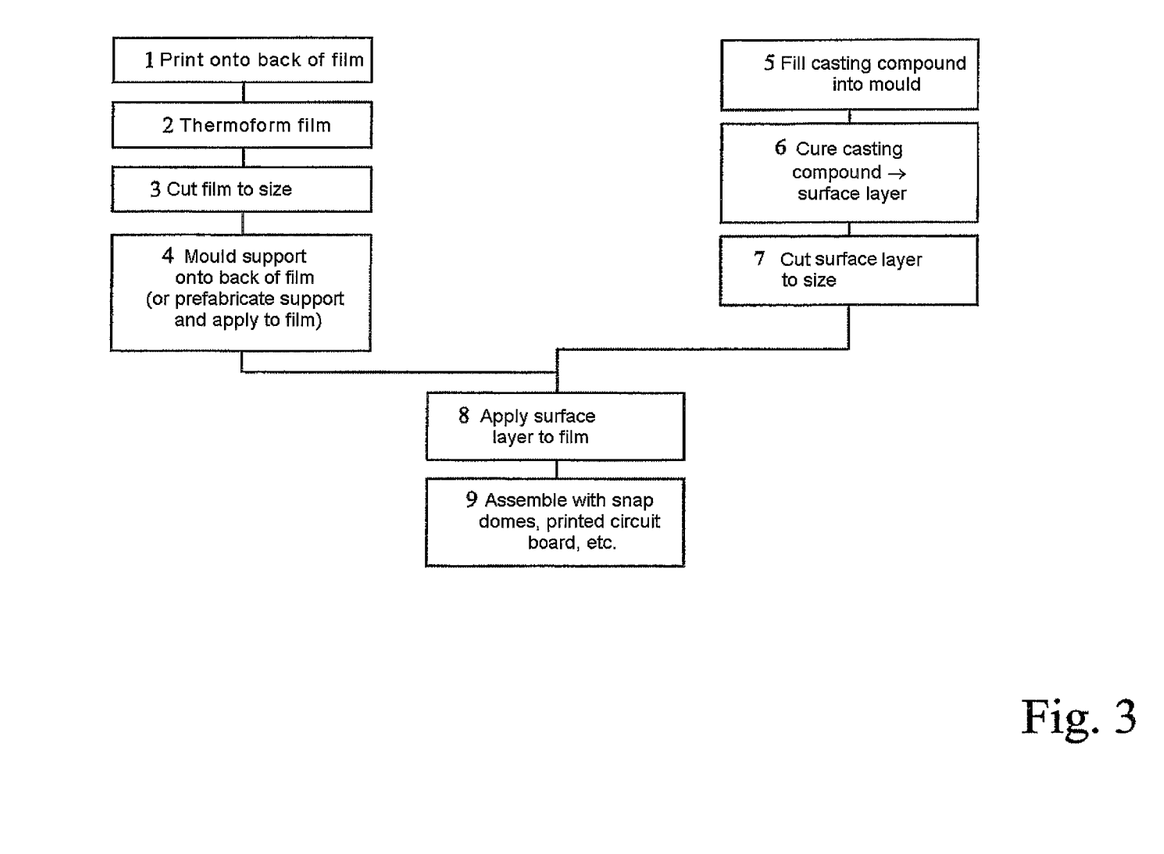
FIG. 3 shows the individual method steps in a method in which the surface layer is laminated.
Figure 4:
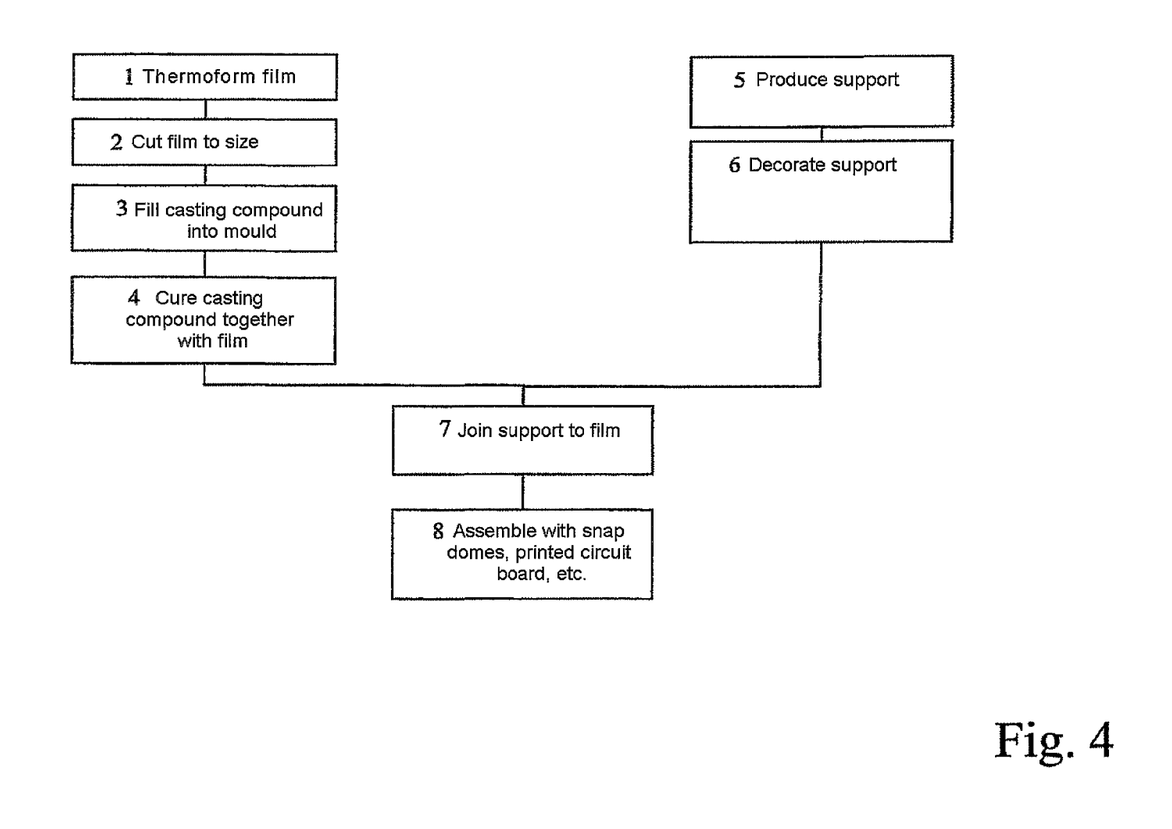
FIG. 4 shows the individual method steps in a method in which the support is decorated.
Figure 5:
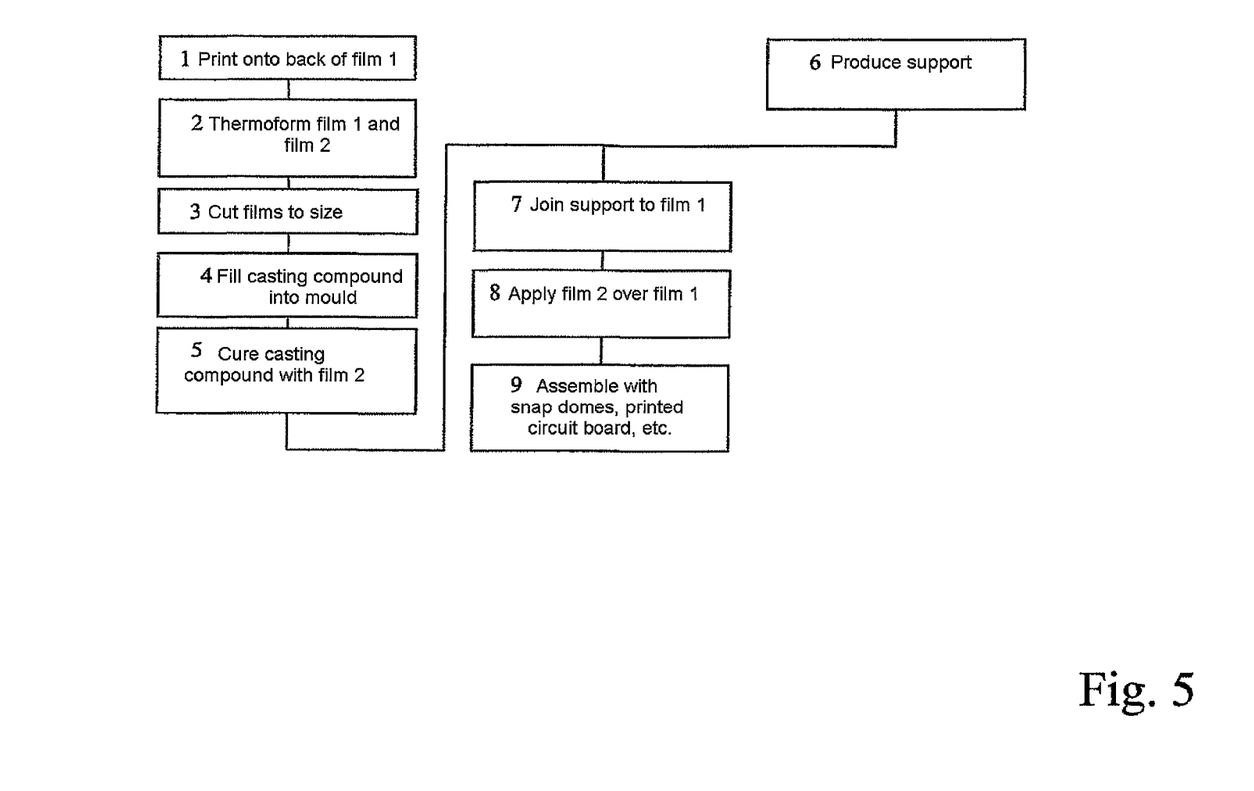
FIG. 5 shows the individual method steps in a method in which two films are laminated.
Figure 6:
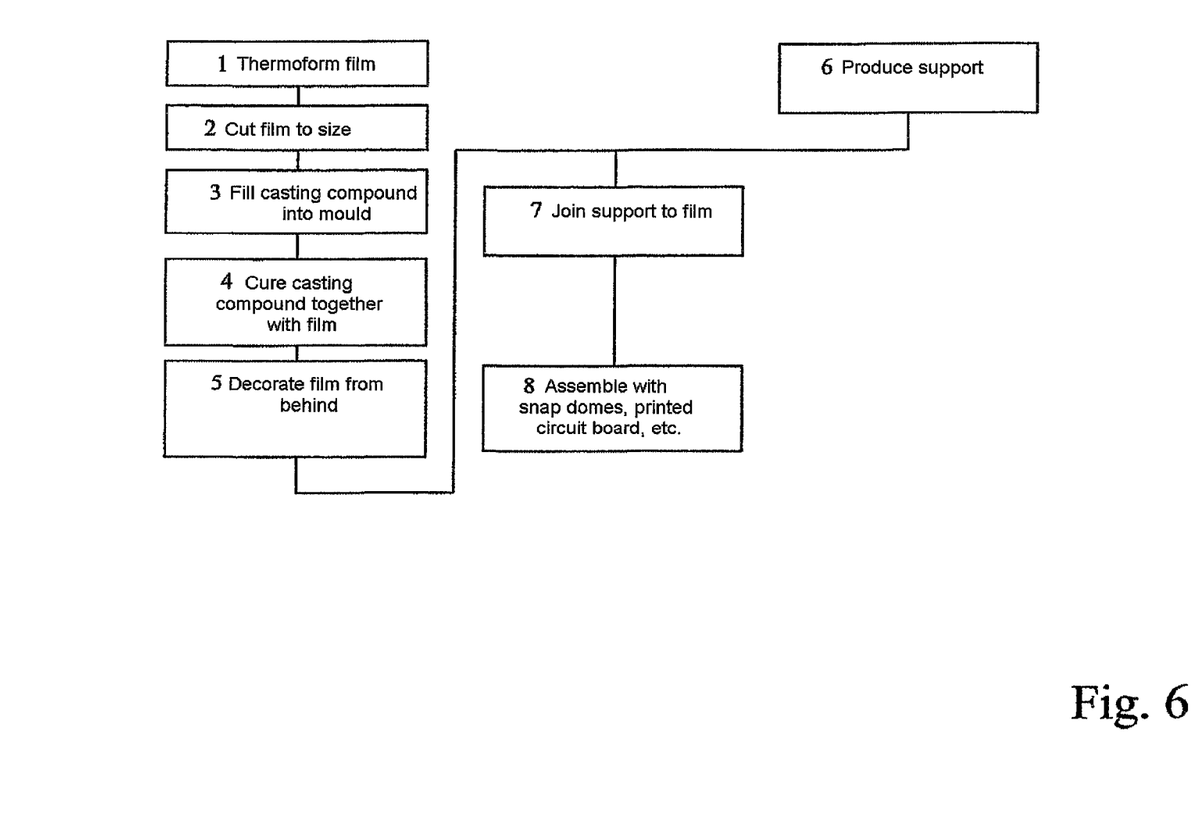
FIG. 6 shows the individual method steps in a method in which the film is three-dimensionally decorated from behind.
Figure 7:
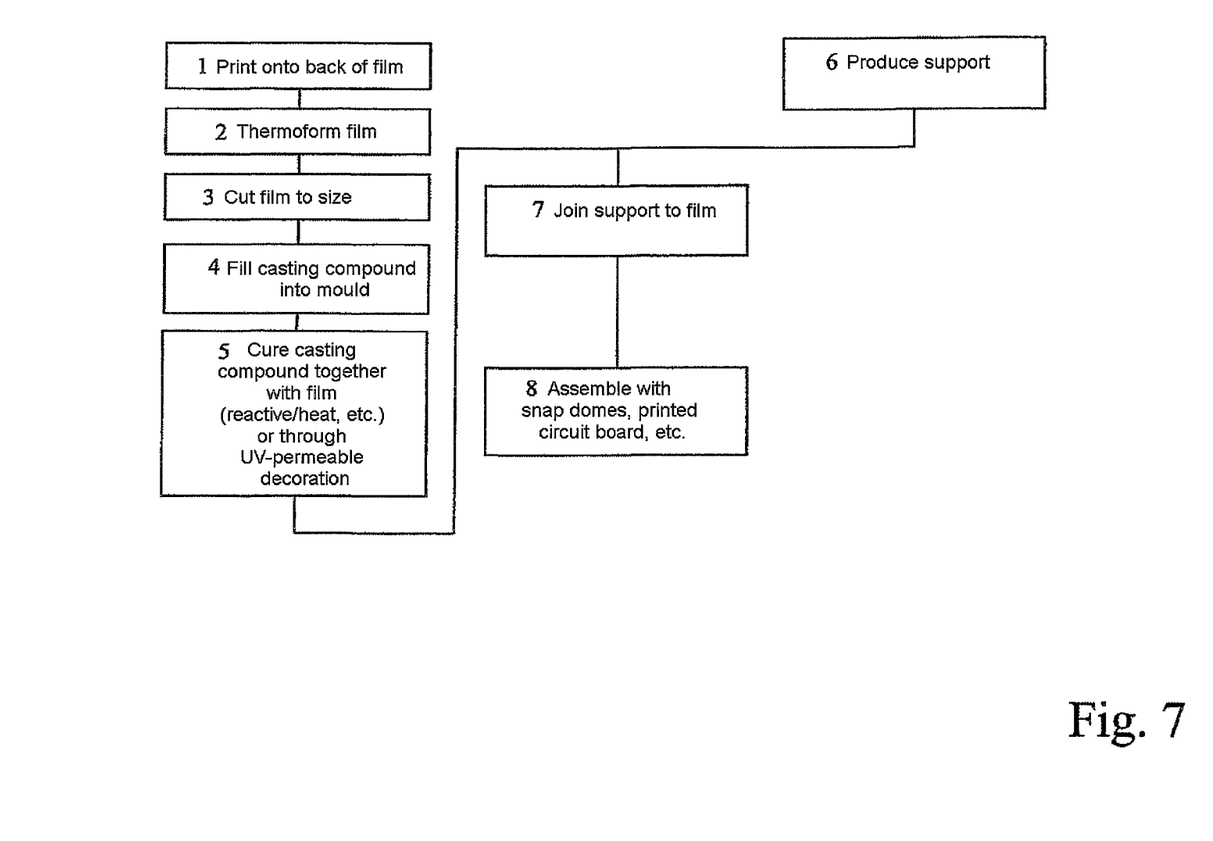
FIG. 7 shows the individual method steps in a method in which the film is cured through the decoration.
Figure 8:
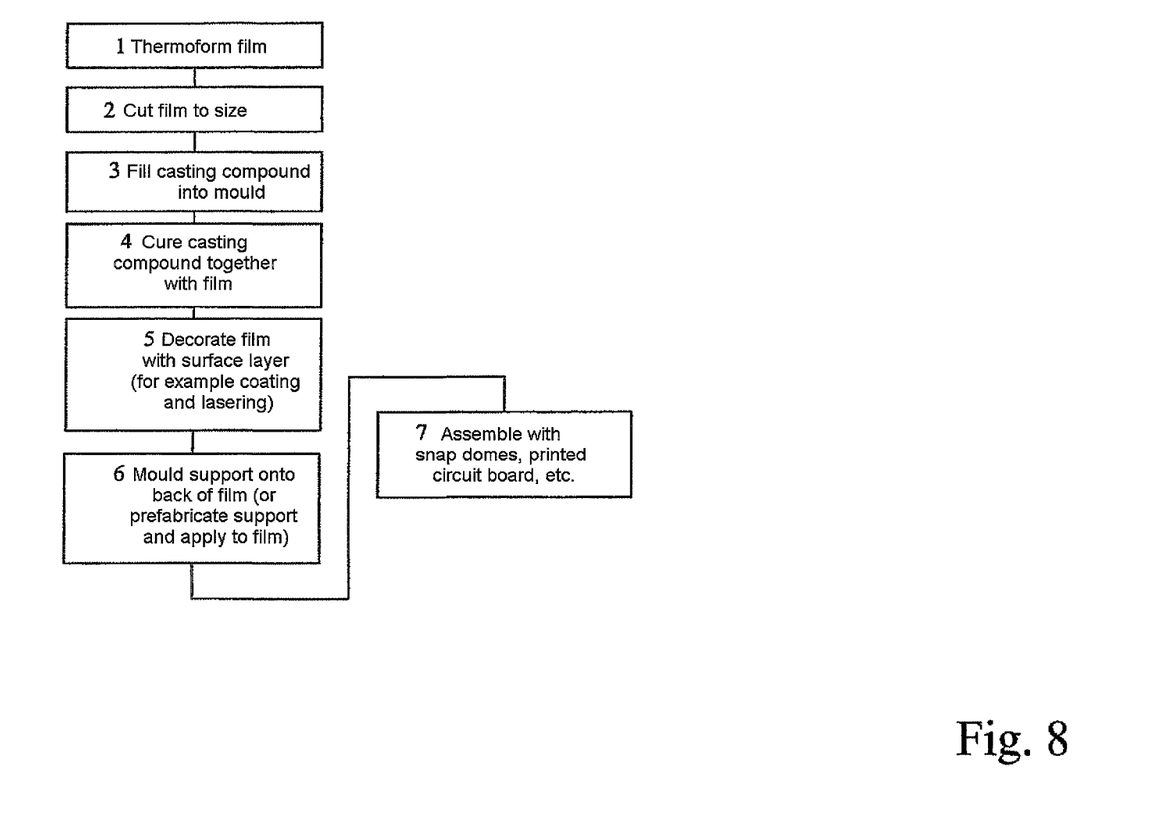
FIG. 8 shows the individual method steps in a method in which the decoration is provided on the surface layer.

In FIG. 2b, the mould 13 for the surface layer is represented in the closed state. Now the casting compound has not only been filled into the mould 13 (female) but also compressed in form and distributed in the gap between it and the counterpunch 17 or pressing plunger (male stamp). Also arranged between it and the counterpunch 17 is a UV-permeable film 2. The counterpunch 17 preferably consists, for example, of polycarbonate and is permeable to UV light.

In other words, a preformed film 2 is for example placed on the counterpunch 17 and the counterpunch 17 is introduced into the impression 15 of the mould 13 with the aid of the guiding elements 20, which are provided on the mould 13 and engage in guiding openings in a plate of the counterpunch, the casting compound, which at this time is still non-elastically deformable and substantially free-flowing, being distributed in the gap and filling all possible hollow spaces. If appropriate, an overflow channel 19 may be provided in order to lead excess casting compound 14 away. The final form is cast in the casting compound 16 in this state, but the casting compound is still free-flowing. Correspondingly, a UV light source for curing the casting compound is subsequently switched on, so that the UV light can impinge on the casting compound 16 through the counterpunch 17 and through the film 2 and can initiate the curing in said compound.

The methods described are primarily ones in which the casting compound cures under the effect of UV light. Other curing processes such as by temperature or moisture or chemical reactions are, however, also included in this application. The surface layer 4 may either be produced in a separate process and then applied to the film 2 (method 1) or it may be joined to the preformed film directly during the moulding process (methods 2-6). It is also possible to apply the surface layer to the flat film and then form it into the three-dimensional geometry together with the latter.

The mould 13 with the outer form for the key geometry and the surface structure is typically produced from steel with a nonstick coating, so that the casting compound 14/16 does not stick in the mould. The mould 13 may, however, also consist of silicone or some other material. The material of the mould may be transparent, in order to make it possible for UV light to be irradiated through the mould, for example made of transparent silicone or glass. Silicone moulds can be easily produced in large numbers and have the advantage that the casting compound does not stick.

The viscosity of the casting compound 14 is of particular significance. With high viscosity, the casting compound stays in the three-dimensional form, but must still be easy to introduce. By means of an elastic trowel, the casting compound 14 can be distributed as uniformly as possible in the mould before the introduction of the punch 17. Then, the already thermoformed film 2 is applied to the pressing plunger 17. By applying pressure by means of the pressing plunger 17, the casting compound 14 is squeezed into the correct position and then cured by means of UV light 18. The guide 20 ensures that the counterpunch 17 and film 2 come to lie in the correct position.

Polycarbonate is suitable as the counterpunch 17, but other materials such as silicone, glass or combinations of materials are also possible, such as for example polycarbonate coated with silicone.

In the case of a low viscosity of the casting compound, the latter is only squeezed into the form by the pressure applied by the pressing plunger 17. In this case, an overflow channel 19 in the mould is helpful.

In the case of a further possible method, the film is omitted and the casting compound cures directly between the mould 13 and the pressing plunger 17. In this case, the pressing plunger 17 should of course also have a surface to which the casting compound 14 does not stick.

If need be, the mould may be closed and curing performed under a vacuum, in order to avoid air inclusions.

Assembly: if they have not been brought together in the production step, the individual layers may be assembled by means of conventional means, such as self-adhesive film, adhesive (for example UV adhesive) or pressing.

Backlighting: the backlighting of the keys or illumination of individual areas or functional lighting may be realized by means of normal LEDs. However, it is also possible in the case of flat structures to use a light guiding film or EL films.

Snap domes: to obtain tactile feedback of the key actuation, a snap dome 5 is provided underneath the support 1. The actuating force and snap can be influenced by selection of the snap dome 5. The snap dome 5 may either be integrated directly into the support 1 or be fastened as a metal dome array to the support 1 or the printed circuit board 11. The snap dome 5 is activated by way of an actuating plunger 7 that is formed on in the support.

An outer overload protecting ring 8 may be provided as overload protection on the actuating plunger 7, so that, when the key is excessively depressed, the full force is not exerted on the snap dome 5, but is at least partially intercepted by the ring 8.

Snap domes 5 with a central hole for central LED lighting may also be used.

Instead of snap domes 5, contact pills may also be placed into the plunger 7 of the support 1. In the case of a short stroke of about 0.2 mm, these respond to low pressure and thus form touch keys.

Other systems for actuation detection are also possible, such as capacitive keys or their combination in parallel or in series.

The following aspects may be specified among others as possible advantages:
  A three-dimensionally curved user interface
  without gaps between keys
  with movable keys with tactile feedback
  with formed-on keys and webs even with sharp edges of any desired form
  with any desired surface structures
  with integrated decorative parts of plastic, metal or other materials
  with backlighting and functional lighting
  of a flat construction
  with reduced component parts.

Examples of applications of the proposed structure are as follows: an operating unit in the centre console of automobiles, a car radio, a climatic control system, etc.; a steering wheel switch; a door handle with integrated keys; a computer mouse; games consoles; a keypad for mobile phones and desktop phones. In such devices, integrated onto the proposed structure.

To sum up, the following aspects of the invention can be stated:

Proposed is a user interface comprising a deformed (not flat) film which on the upper side has structures additionally formed on by means of a surface layer.

Also proposed is a method for decorating a user interface comprising such a deformed film. Particularly a method for producing the surface layer on the user interface from such a deformed film by means of the described mould with a UV-permeable pressing plunger.

Proposed is such a user interface which is applied to a support of transparent plastic material. The support may in this case have snap domes or contact pills on the underside of the keys for key haptics and electrical contact. The support may have a membrane running around the key geometry in order to make the key stroke possible. The support may have an actuating plunger for a snap dome or a conducting contact pill in order to initiate a contact. The actuating plunger may have a ring as overload protection for the snap dome. The support may actuate a tact switch or other contact technology. The elastic support may be combined with a hard reinforcement, in order to produce a hard surface in the non-key region. The support may have light guides or light shields, in order to realize functional lighting. Decorative inserts may be provided in the surface layer.

Also proposed is a film for such a user interface, the film having a scratch-resistant or fingerprint-resistant coating, in order to protect the locations where there is no surface layer.

Also proposed is a surface layer for such a user interface, it being possible for this to be applied in a desired thickness, form and structure as a closed surface or only in individual regions. In this case, the entire layer may be provided with a transparent protective layer, for example to increase scratch resistance; moreover, a lens structure may be introduced into the surface in order to achieve optical lens effects. Furthermore, the casting compound may also not cure under UV light but by means of heat or chemical reaction or some other reaction.

LIST OF DESIGNATIONS

1 Support, of transparent plastic material (for example silicone)
1a Support of hard plastic with cutouts in the key region
2 Film, three-dimensionally deformed, flexible and transparent
3 Decorative layer, for surface colour, symbols, and/or effects
4 Surface layer, of transparent casting compound
5 Snap dome, for key haptics and electrical contact
6 Membrane, in support for key actuation
7 Actuating plunger, for snap dome
8 Overload protecting ring, for snap dome (optional)
8a Microswitch or switching mat
9 Reinforcement, hard, in support, optional
10 Decorative inserts, for example of plastic or metal
11 Printed circuit board, with electrical countercontacts and LEDs for backlighting
12 Three-dimensional surface structure, formed in 4
13 Compression mould, preferably with nonstick surface for the casting compound
14 Casting compound, before shaping
15 Impression, inner form of 13
16 Casting compound, after shaping
17 Counterpunch, UV-permeable 18 UV irradiation
19 Overflow channel for excess casting compound
20 Guide for counterpunch
21 Shaping of the surface curvature in 13
22 Shaping of the individual key shape in 13
23 Surface curvature on the front side
24 Surface impression on the rear side
25 Cutout in 1*a*

The invention claimed is:

1. A method for producing a flexible, three-dimensional coating structure for a flexible switch or flexible user interface, said coating structure having front side surface curvature with formed-on keys and a rear side impression, the method comprising:
   thermoforming a first decorative transparent film onto a compression moulding counterpunch;
   introducing an uncured, transparent casting compound into the cavity of a compression mould, said cavity having a curved surface with deep impressions forming negatives of key-shaped indentations;
   compression moulding said casting compound by introducing the counterpunch and thermoformed film to penetrate at least partially into the mound cavity so that the casting compound conforms to said curved surface between the counterpunch and mould cavity while filling and overflowing said key-shaped indentations; and
   irradiating UV radiation energy into the compression moulded casting compound to cure the casting compound onto said film, thus forming a substantially self-supporting, flexible, transparent surface layer having said front side surface curvature and rear side impression, wherein the counterpunch and/or compression mould are substantially permeable to the irradiated UV radiation, and wherein the UV radiation is irradiated through the counterpunch and/or compression mould.

2. The method according to claim 1, wherein at least one decorative film is joined to the front side of said surface layer, and wherein a decoration for each of said films is applied by a printing process before and/or after thermoforming each film.

3. The method according to claim 1, wherein at least one second decorative film is joined to the rear side of said first decorative film with a material bond.

4. The method according to claim 3, wherein the at least one second film is thermoformed before said joining and has a surface decoration on a front and/or rear side thereof.

5. The method according to claim 1, wherein a support of transparent elastic silicone material or of a transparent hard material having cutouts for a switch is joined to the rear side of said first decorative film and at least indirectly to the rear side of said surface layer by a material bond, and wherein the support is either moulded directly onto the rear side of the first decorative film or is already prefabricated in a three-dimensional shape optionally having a front side surface decoration before joining to said first decorative film.

6. The method according to claim 5, wherein the support has on a rear side facing away from the surface layer actuating plungers which are movable by way of a membrane, and wherein the support and joined surface layer are placed onto and at least indirectly joined to a printed circuit board having snap domes and/or contact pills lying between the support and circuit board, thus forming a switch.

7. The method according to claim 6, wherein light guides, light shielding elements, backlighting, or a combination thereof is provided in a region of the printed circuit board and/or in a region of the support.

8. The method according to claim 7, wherein the light guides, light shielding elements, and/or backlighting are provided using LEDs, a light guiding film, and/or an EL film.

9. The method according to claim 1, wherein a surface decoration is placed on the front side surface of the surface structure and/or wherein decorative inserts are provided in the front side surface of the surface structure, and wherein said inserts can be placed in the compression mould.

10. The method according to claim 1, wherein the compression mould is formed so that the casting compound does not stick thereto while at least in its cured form.

11. The method according to claim 1, wherein the counterpunch does not have positive indentations matching said deep impressions of the mould cavity so that the resulting formed-on keys have a greater thickness than that of surrounding regions thereof.

12. The method according to claim 1, wherein the compression mould has guiding elements for guiding the counterpunch during insertion of the counterpunch into the mould cavity.

13. The method according to claim 1, wherein a decoration is applied to said first decorative film by screen printing, laser printing, stamp printing, or spray printing before and/or after said thermoforming.

* * * * *